US012181115B2

(12) United States Patent
Trentin

(10) Patent No.: US 12,181,115 B2
(45) Date of Patent: Dec. 31, 2024

(54) TWO-PART DEVICE, VEHICLE LIGHT WITH SUCH TWO-PART DEVICE AND METHOD OF MANUFACTURE

(71) Applicant: LUMILEDS LLC, San Jose, CA (US)

(72) Inventor: Eric Trentin, Sury-en-Vaux (FR)

(73) Assignee: LUMILEDS, LLC, San Jose, CA (US)

( * ) Notice: Subject to any disclaimer, the term of this patent is extended or adjusted under 35 U.S.C. 154(b) by 175 days.

(21) Appl. No.: 17/946,811

(22) Filed: Sep. 16, 2022

(65) Prior Publication Data

US 2023/0091867 A1 Mar. 23, 2023

Related U.S. Application Data

(60) Provisional application No. 63/246,162, filed on Sep. 20, 2021.

(51) Int. Cl.
*F21S 41/141* (2018.01)

(52) U.S. Cl.
CPC .................................. *F21S 41/141* (2018.01)

(58) Field of Classification Search
CPC ....... F21S 41/141; F21V 17/06; F21V 17/168
See application file for complete search history.

(56) References Cited

U.S. PATENT DOCUMENTS 6,921,227 B1 7/2005 De Jong et al.
2006/0006602 A1* 1/2006 Roddis ................. F16J 15/3444 277/378
2015/0252991 A1* 9/2015 Li ........................... F21K 9/232 362/646
2016/0091174 A1* 3/2016 Hiki ........................ F21S 43/14 362/296.05

FOREIGN PATENT DOCUMENTS

FR 2979670 3/2013

OTHER PUBLICATIONS

Circlip, https://en.wikipedia.org/wiki/Circlip, Available at: https://web.archive.org/web/20200621101856/https://en.wikipedia.org/wiki/Circlip (Jun. 21, 2020).
Lanxess Joining Techniques, https://techcenter.lanxess.com/scp/americas/en/docguard/Joining_Guide.pdf?docId=77016 , Available at: https://web.archive.org/web/20150908165811/https://techcenter.lanxess.com/scp/americas/en/docquard/Joining_Guide.pdf?docId=77016 (Sep. 8, 2015).
Rotor Clip Company, "The Ultimate Retaining Ring Guide," https://www.rotorclip.com/downloads/UltimateRetainingRingGuide.pdf, Available at: https://web.archive.org/web/20190718124922/https://www.rotorclip.com/downloads/UltimateRetainingRingGuide.pdf (Jul. 18, 2019).

* cited by examiner

*Primary Examiner* — Leah Simone Macchiarolo
(74) *Attorney, Agent, or Firm* — Volpe Koenig

(57) ABSTRACT

A two-part device, automotive lighting unit and method of manufacture are described herein. A two-part device includes an assembly. The assembly includes a first part having a first fixation face and a second part separate from the first part. The second part has a second fixation face. The first and second parts are arranged adjacent one another with the first fixation face in contact with the second fixation face. The assembly further includes a circlip fixation position that has a rounded shape transverse to the fixation face. The two-part device also includes a circlip, which engages the rounded shape at the circlip fixation position, fixing the first and second parts together.

20 Claims, 7 Drawing Sheets

TWO-PART DEVICE, VEHICLE LIGHT WITH SUCH TWO-PART DEVICE AND METHOD OF MANUFACTURE

CROSS REFERENCE TO RELATED APPLICATIONS

This application claims the benefit of U.S. Provisional Patent Application No. 63/246,162, which was filed on Sep. 20, 2021, the contents of which are hereby incorporated by reference herein.

BACKGROUND

Light emitting diodes (LEDs), which may encompass any or all semiconductor light emitting devices, including, for example, diode lasers, more and more replace older technology light sources, such as halogen and Xenon lamps (also referred to as conventional lamps), due to superior technical properties, such as, for example, energy efficiency and lifetime. This is true even for demanding applications, for example in terms of luminance, luminosity, and/or beam shaping, such as, for example, vehicle exterior lighting. Considering the vast installation base of conventional lamps, providing so-called LED retrofit lamps, LED retrofits for short, more or less one-to-one replacing conventional lamps while allowing continued use of other system components, such as optics (e.g., reflectors and lenses) and luminaires, may be of great economic interest.

SUMMARY

A two-part device, automotive lighting unit and method of manufacture are described herein. A two-part device includes an assembly. The assembly includes a first part having a first fixation face and a second part separate from the first part. The second part has a second fixation face. The first and second parts are arranged adjacent one another with the first fixation face in contact with the second fixation face. The assembly further includes a circlip fixation position that has a rounded shape transverse to the fixation face. The two-part device also includes a circlip, which engages the rounded shape at the circlip fixation position, fixing the first and second parts together.

BRIEF DESCRIPTION OF THE DRAWINGS

A more detailed understanding can be had from the following description, given by way of example in conjunction with the accompanying drawings wherein.

DETAILED DESCRIPTION

Figure 1:
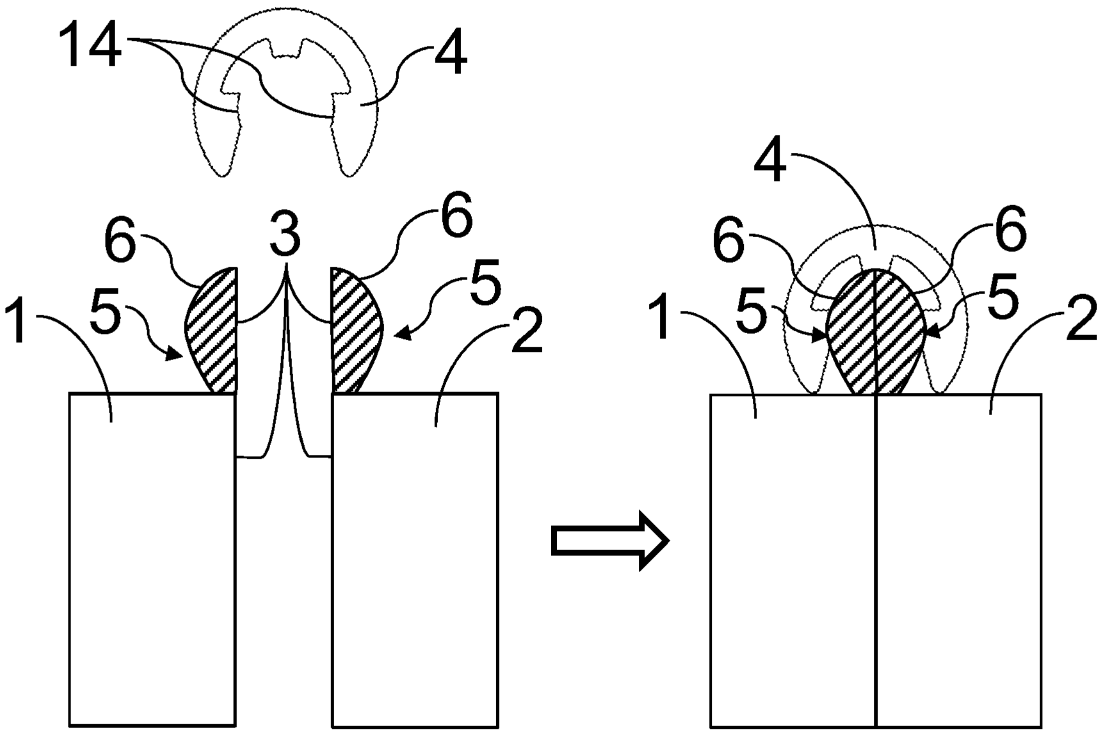
FIG. 1 is a schematic view of a section of a two-part device before and after assembly.

Examples of different light illumination systems and/or light emitting diode ("LED") implementations will be described more fully hereinafter with reference to the accompanying drawings. These examples are not mutually exclusive, and features found in one example may be combined with features found in one or more other examples to achieve additional implementations. Accordingly, it will be understood that the examples shown in the accompanying drawings are provided for illustrative purposes only and they are not intended to limit the disclosure in any way. Like numbers refer to like elements throughout.

It will be understood that, although the terms first, second, third, etc. may be used herein to describe various elements, these elements should not be limited by these terms. These terms may be used to distinguish one element from another. For example, a first element may be termed a second element and a second element may be termed a first element without departing from the scope of the present invention. As used herein, the term "and/or" may include any and all combinations of one or more of the associated listed items.

It will be understood that when an element such as a layer, region, or substrate is referred to as being "on" or extending "onto" another element, it may be directly on or extend directly onto the other element or intervening elements may also be present. In contrast, when an element is referred to as being "directly on" or extending "directly onto" another element, there may be no intervening elements present. It will also be understood that when an element is referred to as being "connected" or "coupled" to another element, it may be directly connected or coupled to the other element and/or connected or coupled to the other element via one or more intervening elements. In contrast, when an element is referred to as being "directly connected" or "directly coupled" to another element, there are no intervening elements present between the element and the other element. It will be understood that these terms are intended to encompass different orientations of the element in addition to any orientation depicted in the figures.

Relative terms such as "below," "above," "upper,", "lower," "horizontal" or "vertical" may be used herein to describe a relationship of one element, layer, or region to another element, layer, or region as illustrated in the figures. It will be understood that these terms are intended to encompass different orientations of the device in addition to the orientation depicted in the figures.

Conventional vehicle lamps typically have elongated shapes, such as a cylinder shape, with halogen lamps, such as the H7 and H4, being typical examples. For mimicking the 360° emission pattern of a gas-discharge arc or of an incandescent filament, LED retrofits may employ one or more LEDs on opposite sides of a carrier to direct the Lambert emission of the LEDs to opposite half spaces complementing each other to an approximated 360° beam pattern.

In assembling such an LED retrofit, it may be made as a two-part device including a separate first part and a separate second part, which may form two halves of the LED retrofit, which may be fixed together at a fixation face. The two halves are usually fixed together by screwing, riveting, or gluing. However, doing so requires additional parts (e.g., screws, rivets, glue) and additional process steps. Moreover, the process may require particular care to avoid damage on assembly and guarantee long-term maintenance. For example, screwing or riveting with too high a force may distort the two halves and, in particular, may distort the carrier plates for the LEDs compromising optical properties of the LED retrofit. Additionally or alternatively, a glue may be sensitive to the intense radiation of the LEDs, which may make the glue connection brittle.

FIG. 1 is a schematic view of a section of a two-part device before and after assembly. In the example illustrated in FIG. 1, a separate first part 1 is fixed to a separate second part 2 at a fixation face 3 using a circlip 4. To do so, the first and second parts 1, 2 may be formed at a circlip fixation position 5 to complement each other to a rounded shape 6 transverse to the fixation face 3.

FIG. 1 shows, in both a disassembled and assembled state, a section through a two-part device comprising the first and second parts 1, 2, which may be fixed together at the fixation face 3. The left part of FIG. 1 shows the assembly before the first and second parts 1, 2 are joined, and the right part shows the assembly when the circlip 4 engages the rounded shape 6 at the circlip fixation position 5. The fixation face 3 of the two-part device may extend perpendicular to the section plane (e.g., perpendicular to the drawing pane of FIG. 1).

Figure 2:
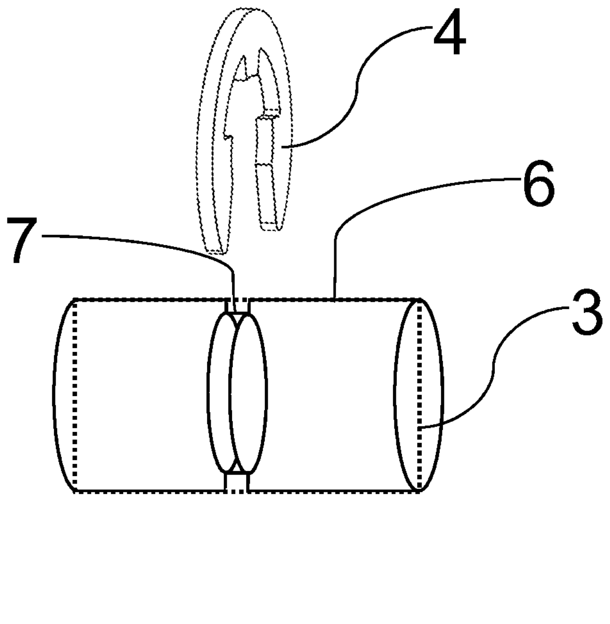
FIG. 2 is a schematic perspective view of a rounded shape with a groove.

FIG. 2 is a schematic perspective view of a rounded shape with a groove. In the example illustrated in FIG. 2, the circlip 4 engages the rounded shape 6 in a groove 7 engraved in the rounded shape 6. The groove 7 may inhibit, in its engaged position, movement of the circlip 4 in the axial direction of the rounded shape (e.g., movement along the fixation face 3). However, such groove 7 may not be needed if the construction avoids axial forces on the circlip 4. In case of potential axial forces on the circlip 4, instead of using a groove 7 to fix the circlip's axial position, other options are possible.

Figure 3:
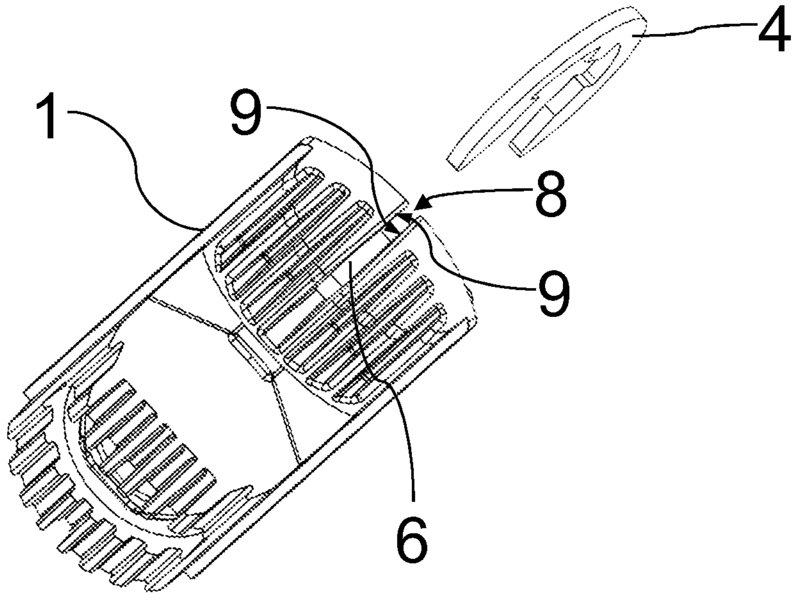
FIG. 3 is a schematic perspective view of an example of a two-part device.

FIG. 3 is a schematic perspective view of an example of a two-part device. In the example illustrated in FIG. 3, the rounded shape 6 is located within a cavity 8 of the two-part device. In such an embodiment, the walls 9 of the cavity 8 will inhibit any detrimental axial movement of circlip 4.

The circlip 4 may take any shape of a one-side open circular clamp as long as jaws 14 of the circlip 4 can securely engage the rounded shape 6 at the circlip fixation position 5 (see FIG. 1). Then, the circlip 4 will inhibit a relative movement of the first and second parts 1, 2 in a direction transverse to the fixation face 3. In other words, the circlip 4 will fix the first and second parts 1, 2 safely to each other in the transverse direction. In particular, industry standard circlips, such as truarc rings, may be used as such a circlip 4. This may allow economy of scale for the circlip component. The rounded shape 6 or, more precisely, the parts of the rounded shape 6 belonging to the first and second parts 1, 2, may be machined from the first and second parts 1, 2, for example, by milling. However, they may be more economically manufactured by insert molding if the first and second parts 1, 2 are made, for example, of moldable plastics. While the circlip 4 inhibits separating the first and second parts 1, 2 transverse to the fixation face 3, movement along (e.g., parallel to) the fixation face 3 may be inhibited by foreseeing mating indentations and protrusions in the first and second parts 1, 2.

Figure 4:
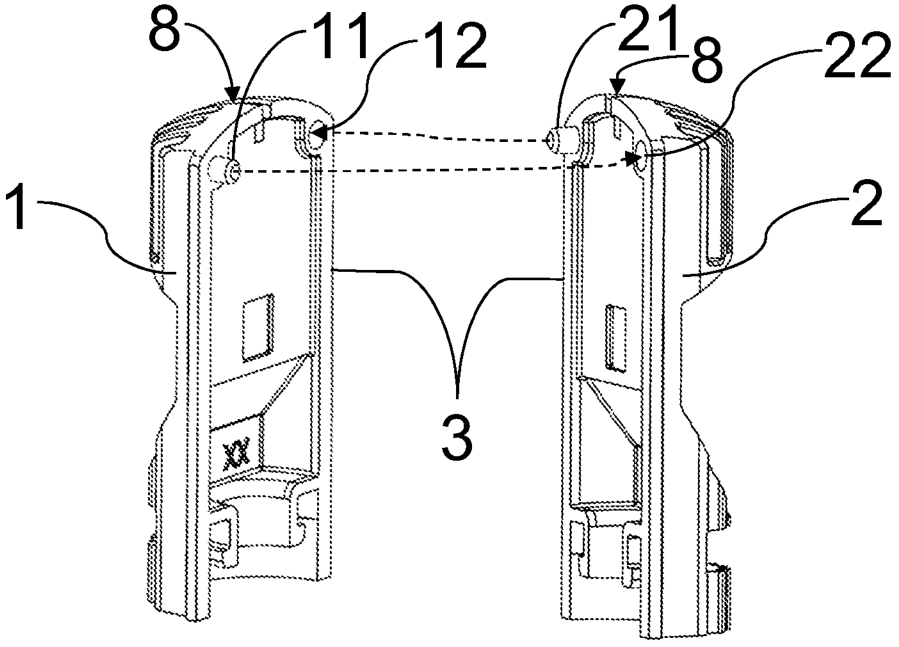
FIG. 4 is a schematic perspective view of another example of a two-part device.

FIG. 4 is a schematic perspective view of another example of a two-part device. In the example illustrated in FIG. 4, first and second parts 1, 2 are shown with a protrusion 11 and an indentation 12 on the first part 1 respectively mating with an indentation 22 and a protrusion 21 on the second part 2. On joining the first and second parts 1, 2, protrusion 11 on first part 1 will intrude into indentation 22 of second part 2, and protrusion 21 on second part 2 will intrude into indentation 12 on first part 1 (see the dashed arrows in FIG. 4). After joining, the circlip 4 will be inserted in the cavities 8 to engage the rounded shape 6 of the joined first and second parts 1, 2 (cf. also FIG. 3). Circlip 4 then will firmly engage rounded shape 6 (not visible in FIG. 4, however, see FIG. 3) and by that will inhibit separating first and second parts 1, 2 transverse to fixation face 3 while the engaged protrusions and indentations 11, 12, 21, 22 will inhibit movement of the first and second parts 1, 2 along the fixation face 3.

Figure 5A:
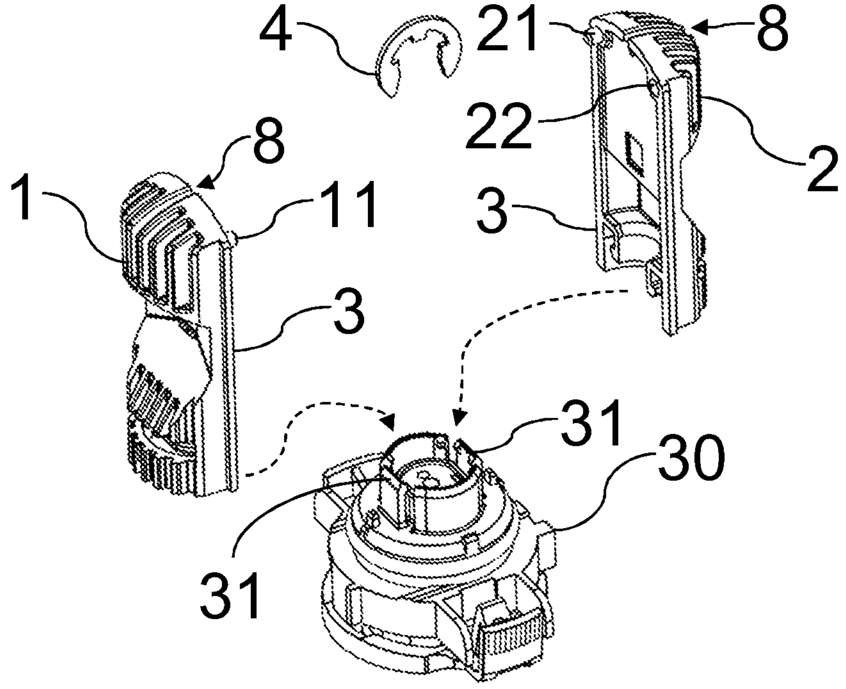
FIG. 5A is a schematic perspective view of the dissembled state of another example two-part device.
Figure 5B:
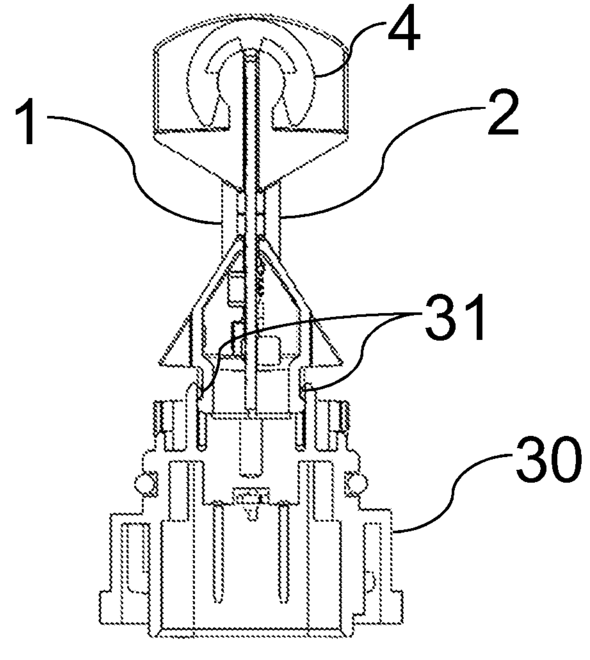
FIG. 5B is a schematic perspective view of the assembled state of another example two-part device.

FIG. 5A and FIG. 5B are schematic perspective views of another example two-part device. The example illustrated in FIG. 5A shows in schematic perspective view the disassembled state of circlip 4 and first and seconds parts 1, 2 to be inserted into a third part 30. FIG. 5B shows the assembled state in a schematic sectional view. First and second parts 1, 2, on their lower side (e.g., opposite to the side where the circlip 4 is fixed in cavity 8) (the circlip position 5), may be introduced into a reception of third part 30 (see the dashed arrows in FIG. 5A) engaging the lower sides of first and second parts 1, 2, for example by a clipping mechanism 31. Thus, the lower sides of first and second parts 1, 2 may be held in the reception of third part 30 whereas circlip 4 may avoid separation of first and second parts 1, 2 transverse to fixation face 3, and mating protrusions and indentations 11, 12, 21, 22 may inhibit movement along fixation face 3. The circlip transverse fixation mechanism may be advantageously used with an LED retrofit vehicle lamp, parts of which have been already shown in FIGS. 3-5A-B.

Figure 6:
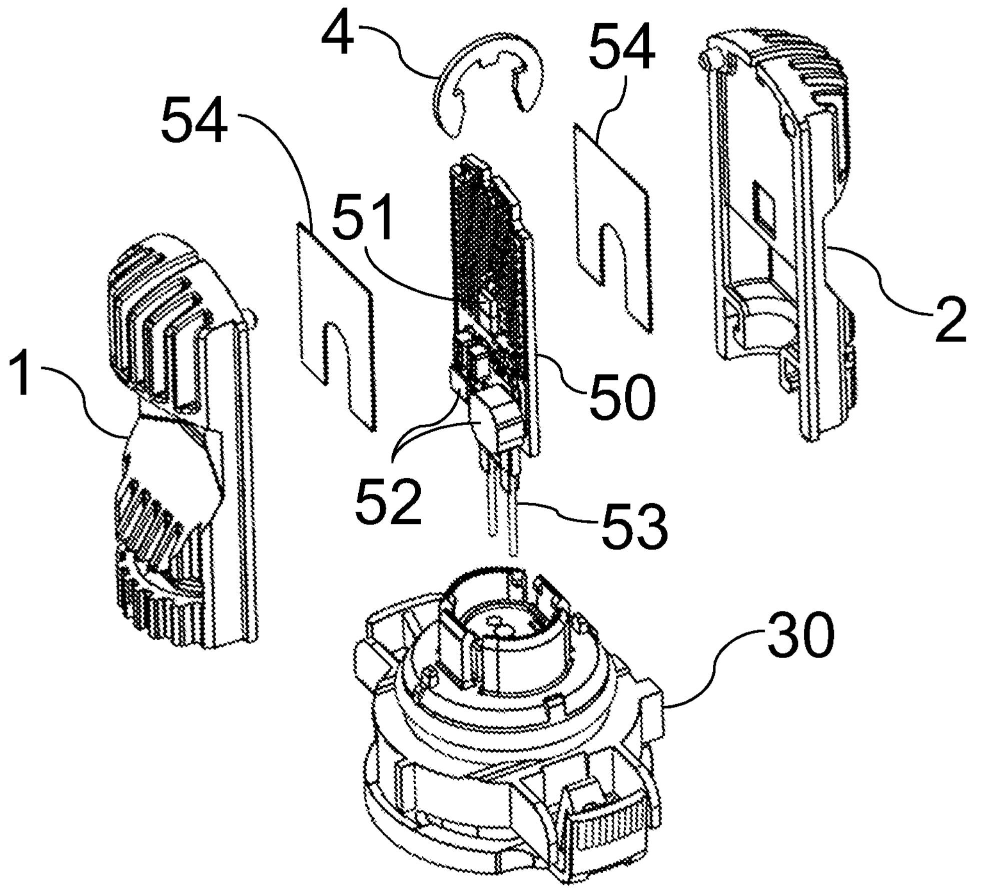
FIG. 6 is a schematic perspective exploded view of an LED retrofit lamp that may be or include any of the example two-part devices described herein.

FIG. 6 is a schematic perspective exploded view of an LED retrofit lamp that may be or include any of the example two-part devices described herein. In such LED retrofit vehicle lamp, the first and second parts 1, 2 may be housing halves (e.g., made of aluminum), and the third part 30 may be the lamp cap (e.g. (mainly or fully) made from plastics). Further discernible are a carrier 50 (e.g., a PCB) onto which LEDs 51 and further electrical components 52 may be mounted and where leads 53 (to be inserted in cap 30) may be connected for electrical power supply. Thermal patches 54 may support heat transfer from the LEDs 51 (and further electrical components 52) to the housing halves 1, 2. Such an LED retrofit vehicle lamp may be employed in a vehicle light, such as for generating a daytime running, a fog, or a signal (e.g. a turn signal) light.

Figure 7:
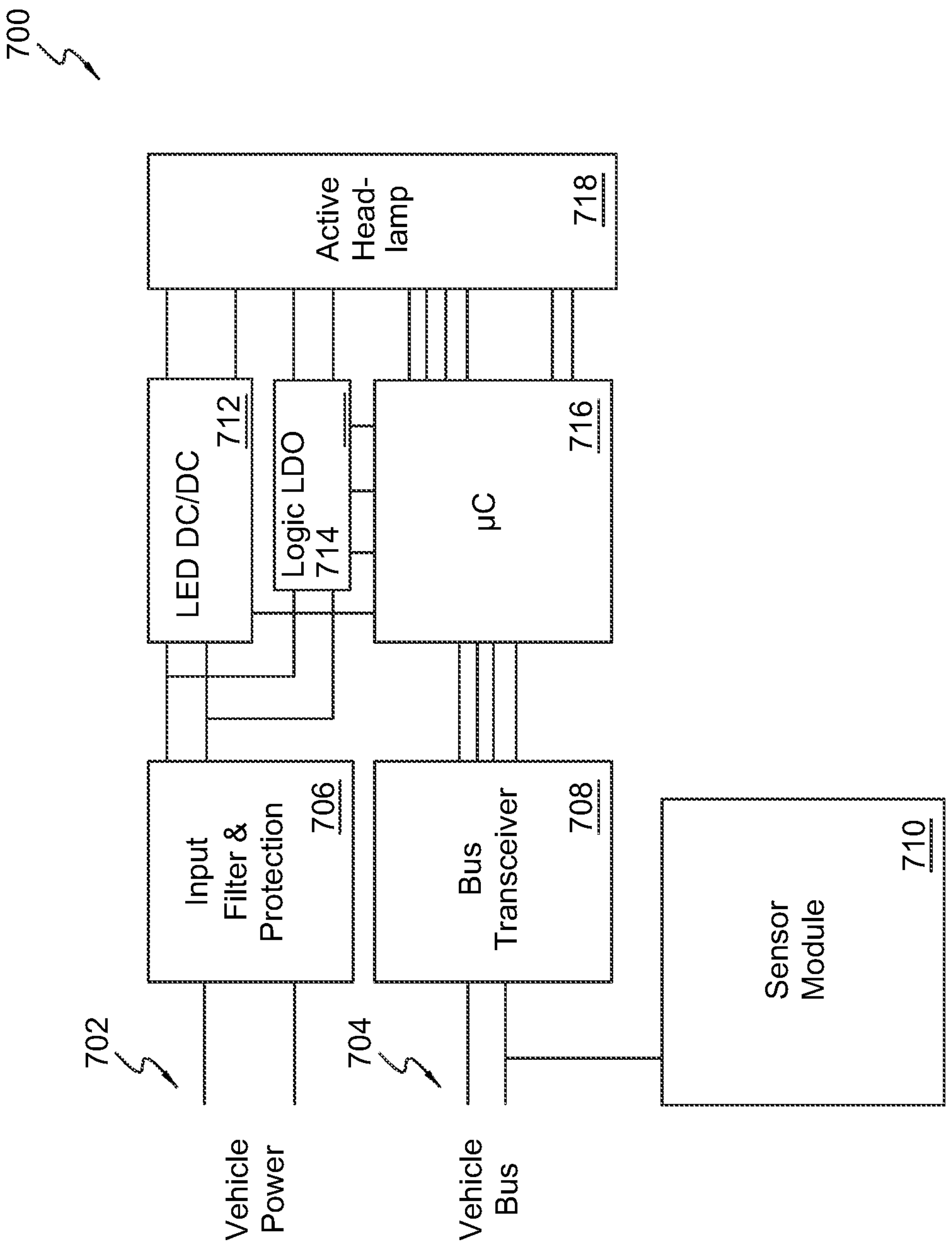
FIG. 7 is a diagram of an example vehicle headlamp system.

FIG. 7 is a diagram of an example vehicle headlamp system 700 that may incorporate one or more of the embodiments and examples described herein. The example vehicle headlamp system 700 illustrated in FIG. 7 includes power lines 702, a data bus 704, an input filter and protection module 706, a bus transceiver 708, a sensor module 710, an LED direct current to direct current (DC/DC) module 712, a logic low-dropout (LDO) module 714, a micro-controller 716 and an active head lamp 718.

The power lines 702 may have inputs that receive power from a vehicle, and the data bus 704 may have inputs/outputs over which data may be exchanged between the vehicle and the vehicle headlamp system 700. For example, the vehicle headlamp system 700 may receive instructions from other locations in the vehicle, such as instructions to turn on turn signaling or turn on headlamps, and may send feedback to other locations in the vehicle if desired. The sensor module 710 may be communicatively coupled to the data bus 704 and may provide additional data to the vehicle headlamp system 700 or other locations in the vehicle related to, for example, environmental conditions (e.g., time of day, rain, fog, or ambient light levels), vehicle state (e.g., parked, in-motion, speed of motion, or direction of motion), and presence/position of other objects (e.g., vehicles or pedestrians). A headlamp controller that is separate from any vehicle controller communicatively coupled to the vehicle data bus may also be included in the vehicle headlamp system 700. In FIG. 7, the headlamp controller may be a micro-controller, such as micro-controller (pc) 716. The micro-controller 716 may be communicatively coupled to the data bus 704.

The input filter and protection module 706 may be electrically coupled to the power lines 702 and may, for example, support various filters to reduce conducted emissions and provide power immunity. Additionally, the input filter and protection module 706 may provide electrostatic discharge (ESD) protection, load-dump protection, alternator field decay protection, and/or reverse polarity protection.

The LED DC/DC module 712 may be coupled between the input filter and protection module 106 and the active headlamp 718 to receive filtered power and provide a drive current to power LEDs in the LED array in the active headlamp 718. The LED DC/DC module 712 may have an input voltage between 7 and 18 volts with a nominal voltage of approximately 13.2 volts and an output voltage that may be slightly higher (e.g., 0.3 volts) than a maximum voltage for the LED array (e.g., as determined by factor or local calibration and operating condition adjustments due to load, temperature or other factors).

The logic LDO module 714 may be coupled to the input filter and protection module 706 to receive the filtered power. The logic LDO module 714 may also be coupled to the micro-controller 716 and the active headlamp 718 to provide power to the micro-controller 716 and/or electronics in the active headlamp 718, such as CMOS logic.

The bus transceiver 708 may have, for example, a universal asynchronous receiver transmitter (UART) or serial peripheral interface (SPI) interface and may be coupled to the micro-controller 716. The micro-controller 716 may translate vehicle input based on, or including, data from the sensor module 710. The translated vehicle input may include a video signal that is transferrable to an image buffer in the active headlamp 718. In addition, the micro-controller 716 may load default image frames and test for open/short pixels during startup. In embodiments, an SPI interface may load an image buffer in CMOS. Image frames may be full frame, differential or partial frames. Other features of micro-controller 716 may include control interface monitoring of CMOS status, including die temperature, as well as logic LDO output. In embodiments, LED DC/DC output may be dynamically controlled to minimize headroom. In addition to providing image frame data, other headlamp functions, such as complementary use in conjunction with side marker or turn signal lights, and/or activation of daytime running lights, may also be controlled.

Figure 8:
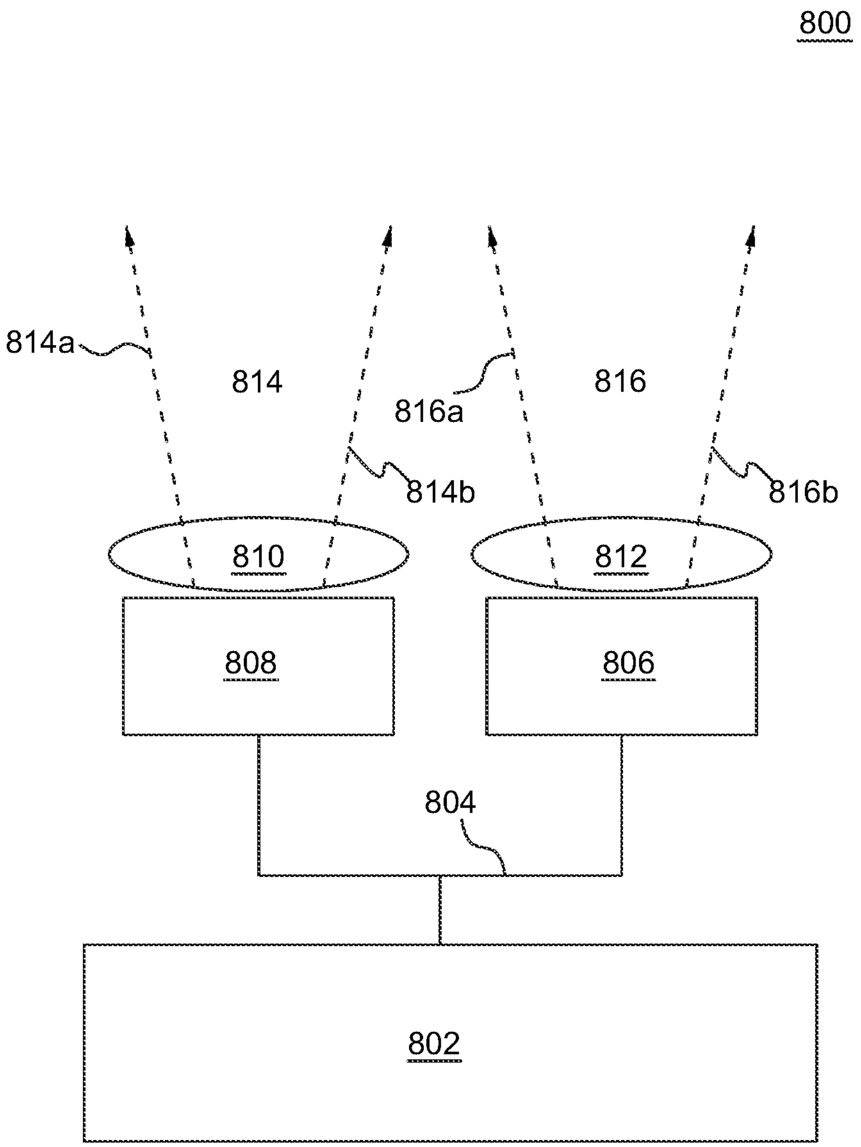
FIG. 8 is a diagram of another example vehicle headlamp system.

FIG. 8 is a diagram of another example vehicle headlamp system 800. The example vehicle headlamp system 800 illustrated in FIG. 8 includes an application platform 802, two LED lighting systems 806 and 808, and secondary optics 810 and 812.

The LED lighting system 808 may emit light beams 814 (shown between arrows 814*a* and 814*b* in FIG. 8). The LED lighting system 806 may emit light beams 816 (shown between arrows 816*a* and 816*b* in FIG. 8). In the embodiment shown in FIG. 8, a secondary optic 810 is adjacent the LED lighting system 808, and the light emitted from the LED lighting system 808 passes through the secondary optic 810. Similarly, a secondary optic 812 is adjacent the LED lighting system 806, and the light emitted from the LED lighting system 806 passes through the secondary optic 812. In alternative embodiments, no secondary optics 810/812 are provided in the vehicle headlamp system.

Where included, the secondary optics 810/812 may be or include one or more light guides. The one or more light guides may be edge lit or may have an interior opening that defines an interior edge of the light guide. LED lighting systems 808 and 806 may be inserted in the interior openings of the one or more light guides such that they inject light into the interior edge (interior opening light guide) or exterior edge (edge lit light guide) of the one or more light guides. In embodiments, the one or more light guides may shape the light emitted by the LED lighting systems 808 and 806 in a desired manner, such as, for example, with a gradient, a chamfered distribution, a narrow distribution, a wide distribution, or an angular distribution.

The application platform 802 may provide power and/or data to the LED lighting systems 806 and/or 808 via lines 804, which may include one or more or a portion of the power lines 702 and the data bus 704 of FIG. 7. One or more sensors (which may be the sensors in the vehicle headlamp system 800 or other additional sensors) may be internal or external to the housing of the application platform 802. Alternatively, or in addition, as shown in the example vehicle headlamp system 700 of FIG. 7, each LED lighting system 808 and 806 may include its own sensor module, connectivity and control module, power module, and/or LED array.

In embodiments, the vehicle headlamp system 800 may represent an automobile with steerable light beams where LEDs may be selectively activated to provide steerable light. For example, an array of LEDs or emitters may be used to define or project a shape or pattern or illuminate only selected sections of a roadway. In an example embodiment, infrared cameras or detector pixels within LED lighting systems 806 and 808 may be sensors (e.g., similar to sensors in the sensor module 710 of FIG. 7) that identify portions of a scene (e.g., roadway or pedestrian crossing) that require illumination.

Figure 9:
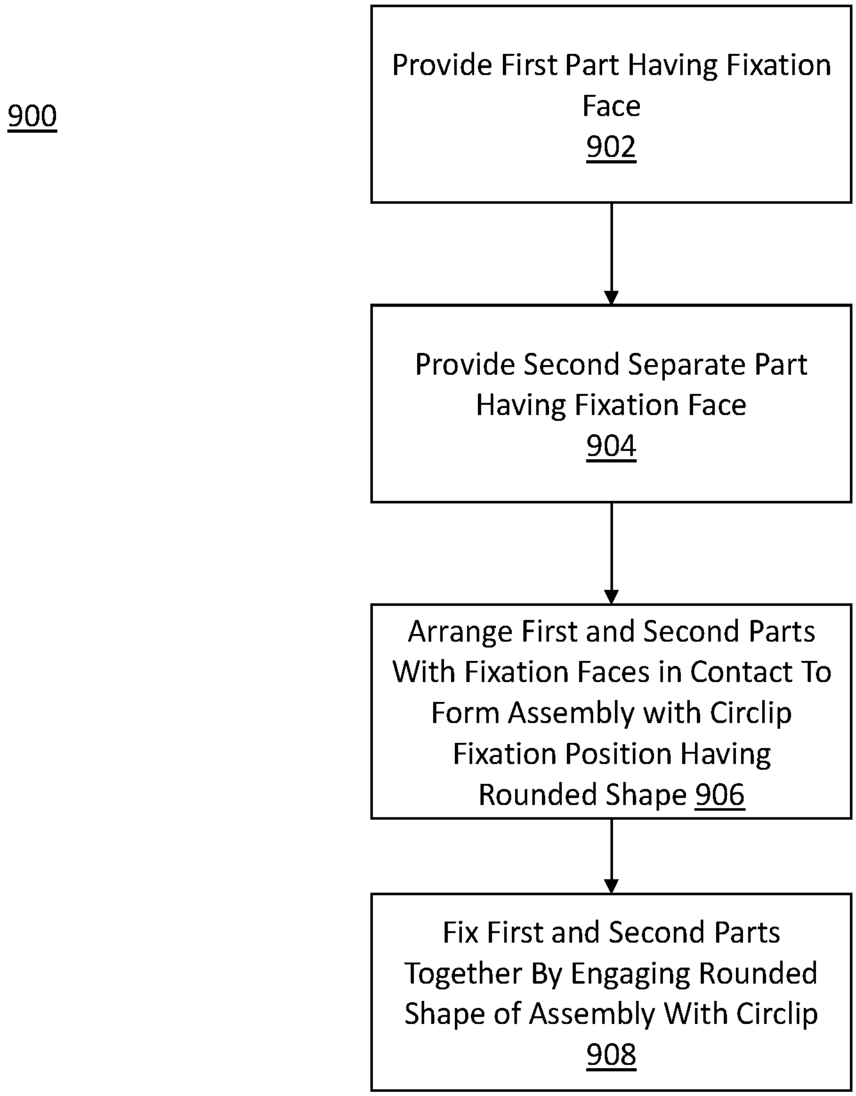
FIG. 9 is a flow diagram of an example method of manufacturing an LED retrofit lamp.

FIG. 9 is a flow diagram of an example method 900 of manufacturing an LED retrofit lamp, such as any of the devices of FIGS. 1-6. In the example illustrated in FIG. 9, the method includes providing a first part having a first fixation face (902), and providing a second part separate from the first part and having a second fixation face (904). The first and second parts may be arranged with their fixation faces in contact with one another to form an assembly (906). The assembly may have a circlip fixation position, which may have a rounded shape transverse to the fixation face. The first and second parts may be fixed together by engaging the rounded shape of the assembly with a circlip.

As would be apparent to one skilled in the relevant art, based on the description herein, embodiments of the present invention can be designed in software using a hardware description language (HDL) such as, for example, Verilog or VHDL. The HDL-design can model the behavior of an electronic system, where the design can be synthesized and ultimately fabricated into a hardware device. In addition, the HDL-design can be stored in a computer product and loaded into a computer system prior to hardware manufacture.

Having described the embodiments in detail, those skilled in the art will appreciate that, given the present description, modifications may be made to the embodiments described herein without departing from the spirit of the inventive concept. Therefore, it is not intended that the scope of the invention be limited to the specific embodiments illustrated and described.

What is claimed is:

1. A device comprising:
an assembly comprising:
a first part having a first fixation face, and
a second part separate from the first part, the second part having a second fixation face, the first and second parts being arranged adjacent one another with the first fixation face in contact with the second fixation face, and
a circlip fixation position having a rounded shape transverse to the first fixation face and the second fixation face; and
a circlip having an at least partially rounded inner surface that engages the rounded shape at the circlip fixation position, fixing the first and second parts together.

2. The device according to claim 1, wherein the rounded shape comprises a groove.

3. The device according to claim 2, wherein the circlip engages the rounded shape in the groove.

4. The device according to claim 1, wherein the assembly further comprises a cavity between the first and second parts.

5. The device according to claim 4, wherein the rounded shape is located within the cavity.

6. The device according to claim 1, wherein the circlip is a truarc ring.

7. The device according to claim 1, wherein the first and second parts each comprise one or more mating indentations and protrusions.

8. The device according to claim 1, further comprising a third part engaging the first and second parts at a position opposite to the circlip fixation position.

9. The device according to claim 1, wherein the device is an LED retrofit vehicle lamp.

10. An automotive lighting unit, comprising:
a lamp fixture; and
an LED retrofit lamp mounted to the lamp fixture, the LED retrofit lamp comprising:
an assembly comprising:
a first part having a first fixation face, and
a second part separate from the first part, the second part having a second fixation face, the first and second parts being arranged adjacent one another with the first fixation face in contact with the second fixation face, and
a circlip fixation position having a rounded shape transverse to the first fixation face and the second fixation face, and
a circlip having an at least partially rounded inner surface that engages the rounded shape at the circlip fixation position, fixing the first and second parts together.

11. The lighting unit of claim 10, wherein the rounded shape comprises a groove.

12. The lighting unit of claim 11, wherein the circlip engages the rounded shape in the groove.

13. The lighting unit of claim 10, wherein the assembly further comprises a cavity between the first and second parts.

14. The lighting unit of claim 13, wherein the rounded shape is located within the cavity.

15. The lighting unit of claim 10, wherein the circlip is a truarc ring.

16. The lighting unit of claim 10, wherein the assembly further comprises a third part engaging the first and second parts at a position opposite to the circlip fixation position.

17. The lighting unit of claim 10, wherein the lighting unit is one of a headlight or a signaling light.

18. A method of manufacturing an LED retrofit lamp, the method comprising:
providing a first part having a first fixation face;
providing a second part separate from the first part and having a second fixation face;
arranging the first and second parts adjacent one another with the first fixation face in contact with the second fixation face to form an assembly comprising a circlip fixation position that has a rounded shape transverse to the first fixation face and the second fixation face;
providing a circlip having an at least partially rounded inner surface; and
fixing the first and second parts together by engaging the rounded shape of the assembly at the fixation position with the at least partially rounded inner surface of the circlip.

19. The method of claim 18, further comprising forming the rounded shape by milling the first and second parts.

20. The method of claim 18, further comprising forming the first and second parts, including the rounded shape, by insert molding.

* * * * *